United States Patent [19]

Ross et al.

[11] 4,283,078
[45] Aug. 11, 1981

[54] FLEXIBLE JOINT PROTECTOR

[76] Inventors: Victor H. Ross, 111 Okinawa Dr.; Victor H. Ross, Jr., Old Apple Orchard, R.D. #3, both of New Castle, Pa. 16105

[21] Appl. No.: 145,872

[22] Filed: May 1, 1980

[51] Int. Cl.³ ............................................. F16L 11/12
[52] U.S. Cl. ..................................... 285/45; 285/227; 285/229; 285/300
[58] Field of Search .............. 285/229, 227, 300, 45, 285/225, 226, 228, 236

[56] References Cited

U.S. PATENT DOCUMENTS

| | | |
|---|---|---|
| 701,936 | 6/1902 | Roberts . |
| 1,732,721 | 10/1929 | Horine ................................ 285/229 |
| 2,207,146 | 7/1940 | Fentress et al. ....................... 285/300 |
| 2,657,075 | 10/1953 | Schwester et al. .............. 285/226 X |
| 3,315,704 | 4/1967 | Shire .................................... 138/121 |
| 3,336,950 | 8/1967 | Fochler ............................ 285/226 X |
| 3,473,828 | 10/1969 | Pearson ............................ 285/229 X |
| 3,490,794 | 1/1970 | Swanson ............................... 285/226 |
| 3,653,690 | 4/1972 | Treveiler ............................... 285/226 |
| 4,090,726 | 5/1978 | Mischel ................................. 285/229 |

*Primary Examiner*—Dave W. Arola
*Attorney, Agent, or Firm*—Harpman & Harpman

[57] ABSTRACT

A Flexible Joint Protector for use with steam pipes of the same or different diameters comprise multiple bellows where the bellows are of different diameters and arranged one within another and have sleeves on their outer sides. Clamps are used to secure the sleeves to the pipes.

4 Claims, 2 Drawing Figures

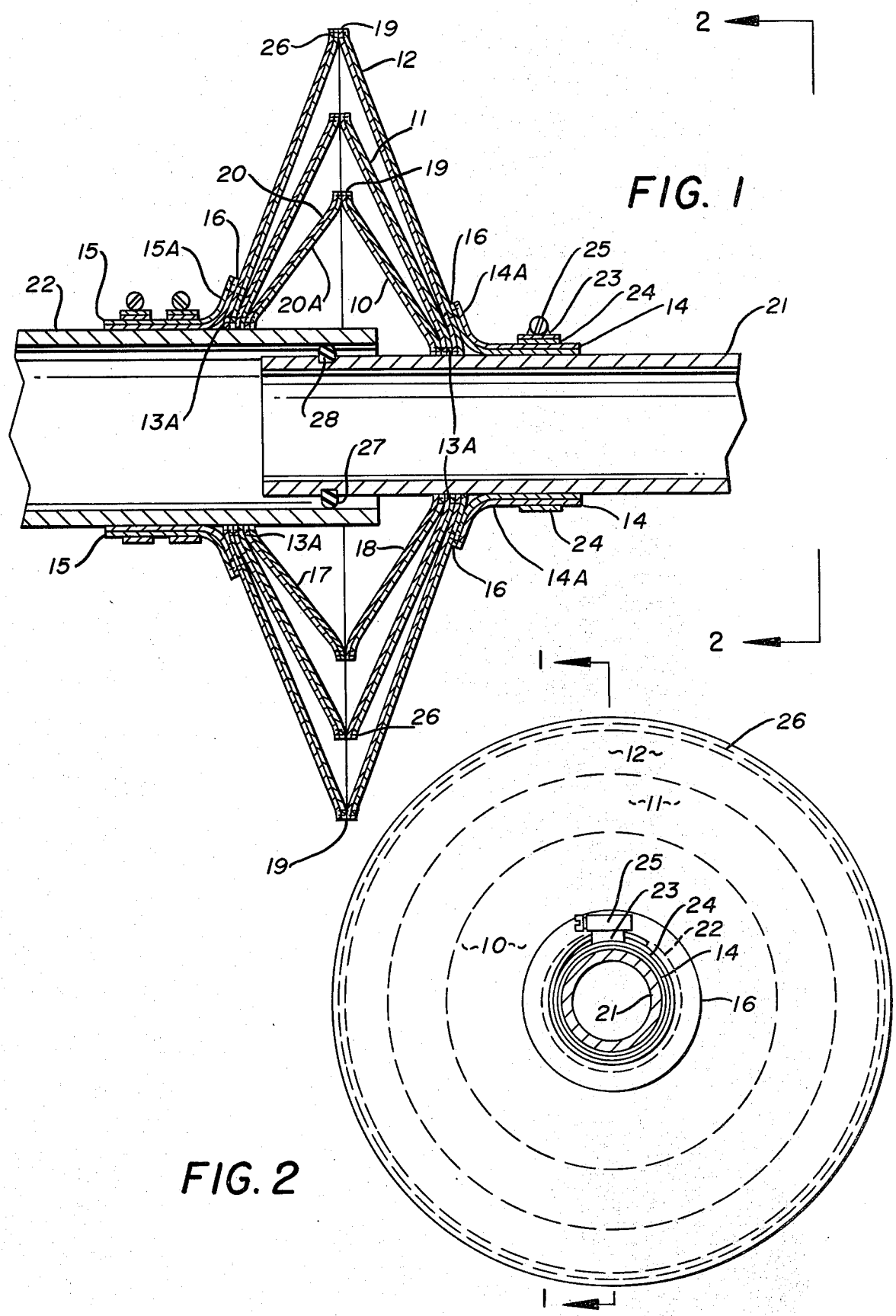

FLEXIBLE JOINT PROTECTOR

BACKGROUND TO THE INVENTION (1) Field of the Invention

This invention relates to flexible pipe couplings used to provide joints between pipes.

(2) Prior Art

Prior art devices have used a variety of different structures having flexible bellows, see for example u.S. Pat. Nos. 3,315,704; 3,490,794 and 701,936.

In. U.S. Pat. No. 3,315,704 a fireproof bellows is disclosed made of a single section of fiberglass, silicone and stainless steel foil.

U.S. Pat. No. 701,936 shows a spout formed of a pair of conical sections.

U.S. Pat. No. 3,490,794 discloses an exhaust manifold joint having an expansible member with tubular ends for use on exhaust manifolds of the type normally found on internal combustion engines.

Applicant's device uses multiple sections of multiple layered flexible sheet material which allows for movement of two different diameter pipes under pressure, the sections are arranged in spaced relation to one another in the form of bellows.

SUMMARY OF THE INVENTION

A flexible joint protector for use on pressurized steam pipes or the like provides sufficient extensibility for both horizontal and vertical movement of the pipes. Several sections of multiple ply flexible material in bellows like form are used to provide the needed strength and permit movement of the pipes.

DESCRIPTION OF THE DRAWINGS

FIG. 1 is a vertical section of the flexible joint protector taken on line 1—1 of FIG. 2 and, FIG. 2 is an end elevation taken on line 2—2 of FIG. 1.

DESCRIPTION OF THE PREFERRED EMBODIMENT

A flexible joint protector as seen in FIGS. 1 and 2 of the drawing comprises a plurality of annular bellows 10, 11 and 12 in spaced radial relation to one another. Each of the bellows 10, 11 and 12 is apertured at its center portion 13 and secured to one another at points 13A adjacent the apertures therein. A pair of sleeves 14 and 15 extend outwardly from either side of the bellows 10, 11 and 12 and have radial flanges 14A and 15A thereon, which are secured to the bellows 12 at a point 16 around said aperture. The bellows 10, 11 and 12 are of different diameters with the bellows 10 being the smallest and the bellows 12 the largest allowing for radial positioning of one within the other. Each of the bellows 10, 11 and 12 are preferably formed of two annual apertured sections of flexible heat resistance sheet material 17 and 18 secured together at their peripheral edges 19. An air impervious flexible material capable of withstanding both high heat and pressure is used. An example of such material being a Neoprene coated Nylon fabric. Neoprene is an oil resistant synthetic rubber like resin made by polimerising chloroprene $Ch_2$—$CClCH$—$CH_2$ which is produced from acetzlene and hydrogen chloride compound. Alternately each of the bellows 10, 11 and 12 can be molded of similar material. Each of the sections of flexible material 17 and 18 are preferably comprised of two or more layers 20 and 20A of said air impervious heat resistant material hereinbefore described.

The flexible joint protector is positioned over and secured to a pair of pipes 21 and 22 by clamps 23 that engage the sleeves 14 and 15 respectively forming an airtight seal there between. The clamps 23 have an annular band 24 that extends around the sleeves 14 and 15 and pipes 21 and 22 and are held in place by screw fasteners 25 as best seen in FIG. 2 of the drawings. The screws 25 engage the bands 24.

Polyester thread 26 is used to sew the several sections of flexible material 17 and 18 together and the radial flanges 14A and 15A on said sleeves 14 and 15 to the outermost bellows 12.

In use the joint protector allows for vertical and horizontal movement of the pipes relative to each other and absorbs vibration. A sealing gland 27 is positioned in an annular groove 28 in the pipe 21 thereby forming a seal between the pipe 21 and the pipe 22 while allowing for lateral movement therebetween.

It will thus be seen that a new and useful flexible joint protector has been illustrated and described and that various modifications and changes therein may be made without departing from the spirit of the invention or from the scope of the apended claims.

What I claim is:

1. A flexible joint protector for use with a pipe joint and comprising an assembly of several spaced individual accordian type bellows, each of said bellows being annular and of different outer diameters, said bellows positioned one within the other with the largest diameter bellows defining the outside of said assembly and the smallest of said bellows defining the inside of said assembly, each of said bellows formed of a pair of flat circular flexible members having central openings and joined at their outer peripheral edges, each of said individual bellows arranged in juxtaposition and joined to one another in the areas about their central openings, each of said bellows made of air impervious material, a pair of tubular sleeves secured to the joined areas about said central openings of said bellows in oppositely disposed outwardly extending relation thereto, clamps securing said sleeves to said pipes on either side of said joint.

2. The flexible joint protector of claim 1 wherein said bellows and sleeves are sewn and sealed to one another in sealing relation.

3. The flexible joint protector of claim 1 wherein said air impervious flexible material is neoprene coated nylon.

4. The flexible joint protector of claim 1 wherein each of said pairs of flat circular flexible members are made of at least two layers of said air impervious flexible material.

* * * * *